United States Patent [19]

Townsend et al.

[11] E Re. 28,503

[45] Reissued Aug. 5, 1975

[54] AUTOMATIC BOWLING SCORER WITH CATHODE RAY TUBE DISPLAY

[75] Inventors: Ralph Townsend, Welwyn Garden City, England; James J. Walker, Brookfield Center, Conn.

[73] Assignee: AMF Incorporated, White Plains, N.Y.

[22] Filed: June 25, 1973 (Under Rule 47)

[21] Appl. No.: 373,375

Related U.S. Patent Documents

Reissue of:

[64] Patent No.: 3,589,725
Issued: June 29, 1971
Appl. No.: 806,244
Filed: Mar. 11, 1969

[52] U.S. Cl...... 273/54 C; 178/7.83; 235/92 GA; 340/323

[51] Int. Cl...... A63d 5/00

[58] Field of Search.. 273/54 C; 178/6.6 DD, 6.6 A, 178/7.83; 340/323, 324 A; 235/92 GA

[56] References Cited

UNITED STATES PATENTS

| | | | |
|---|---|---|---|
| 3,202,803 | 8/1965 | Markstrom | 273/54 C UX |
| 3,375,352 | 3/1968 | House et al. | 273/54 C X |
| 3,397,283 | 8/1968 | Stosberg et al. | 178/6.6 DD UX |
| 3,453,384 | 7/1969 | Donner et al. | 340/324 A X |
| 3,488,055 | 1/1970 | Reynolds | 273/54 C |

FOREIGN PATENTS OR APPLICATIONS

| | | | |
|---|---|---|---|
| 742,107 | 9/1966 | Canada | 273/54 C |

*Primary Examiner*—Anton O. Oechsle
*Attorney, Agent, or Firm*—George W. Price; Walter Lewis

[57] ABSTRACT

An automatic bowling scorer which calculates scores in accordance with the rules of the game from signals representative of pinfall and having a cathode-ray tube for presenting a visual display of the history of the game of bowling wherein the face of the cathode-ray tube is divided into identifiable discrete areas to represent the frames of the game for at least one player.

40 Claims, 10 Drawing Figures

INVENTORS
RALPH TOWNSEND
JAMES J. WALKER
BY
Eli Weiss
ATTORNEY

INVENTORS
RALPH TOWNSEND
BY JAMES J. WALKER

ATTORNEY

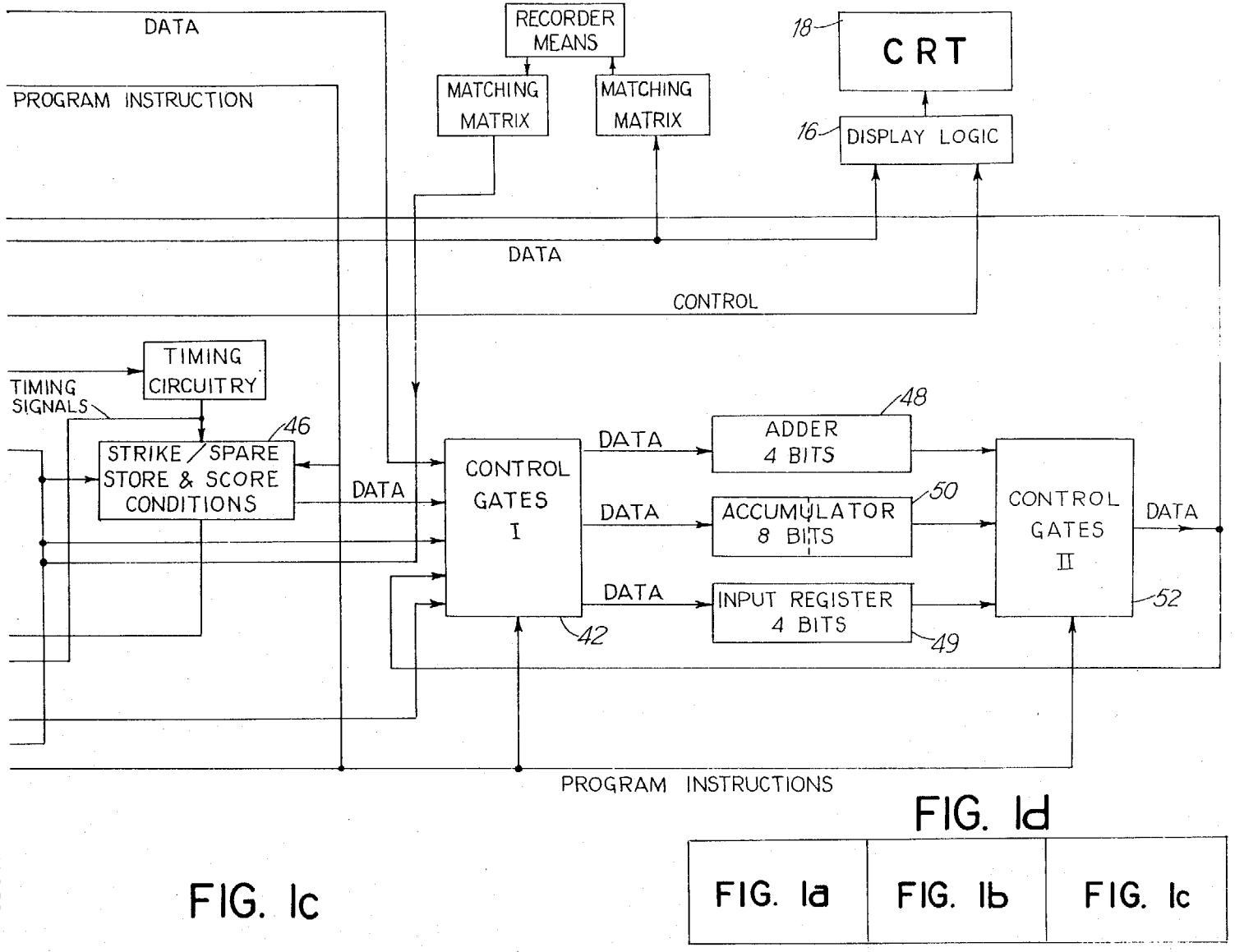
FIG. Ic
INVENTORS
RALPH TOWNSEND
JAMES J. WALKER
BY
ATTORNEY

INVENTORS
RALPH TOWNSEND
BY JAMES J. WALKER

ATTORNEY

INVENTORS
RALPH TOWNSEND
BY JAMES J. WALKER
ATTORNEY

INVENTORS
RALPH TOWNSEND
BY JAMES J. WALKER

ATTORNEY

AUTOMATIC BOWLING SCORER WITH CATHODE RAY TUBE DISPLAY

Matter enclosed in heavy brackets [ ] appears in the original patent but forms no part of this reissue specification; matter printed in italics indicates the additions made by reissue.

---

This invention relates generally to the game of bowling and more particularly to an automatic bowling score calculating device which computes the score as the game progresses and displays the history of the game in a prominent manner.

It is an object of this invention to provide an automatic bowling scorer having a cathode-ray tube as a display of the history of the game.

It is another object of this invention to provide an automatic bowling scorer that can identify the player next to bowl.

It is yet another object of this invention to provide an automatic bowling scorer which can identify the lane that is to be used by the next bowler during team play.

It is still another object of this invention to provide an automatic bowling scorer which can correct an error in the display of the history of the game.

It is still another object of this invention to provide an automatic bowling scorer which permits a bowler, during team play, to take himself out of the game for one or more frames.

It is still another object of this invention to provide an automatic bowling scorer that makes a permanent record of the history of the game.

It is still another object of this invention to provide an automatic bowling scorer that can accept manually entered information.

It is still another object of this invention to provide an automatic bowling scorer that is economical to build and reliable in operation.

Other objects and many of the attendant advantages of this invention will be readily appreciated as the same becomes better understood by reference to the following detailed description when considered in connection with the accompanying drawings wherein:

FIGS. 1a, 1b and 1c when positioned relative to each other as illustrated in FIG. 1d form FIG. 1 which is a block diagram of structure in accordance with the principles of the invention;

The automatic bowling scorer here disclosed can be thought of as a special purpose digital computer having a fixed wired program and using a magnetostrictive delay line as a memory means. A cathode-ray tube fed by the delay line displays the history of the game as it progresses. If desired, a recording means such as magnetic tape, punch tape or the like can be utilized to provide a permanent history of the progress of the game.

This invention is designed to accommodate two five-man teams that bowl against each other in accordance with the ABC rules governing team play. In addition, the automatic bowling scorer follows normal player procedures such as the superstition factor for a plurality of consecutively occurring strikes, the computation of marks during the course of the first nine frames of play and the like.

Under normal team play, the automatic bowling scorer is time shared to accept input information signals from three input stations; a bowler's control console or keyboard, and a pair of pinspotters (one for each lane). The automatic bowling scorer receives information signals and calculates bowling scores from the three input stations in accordance with the rules of bowling.

Figure 1A:
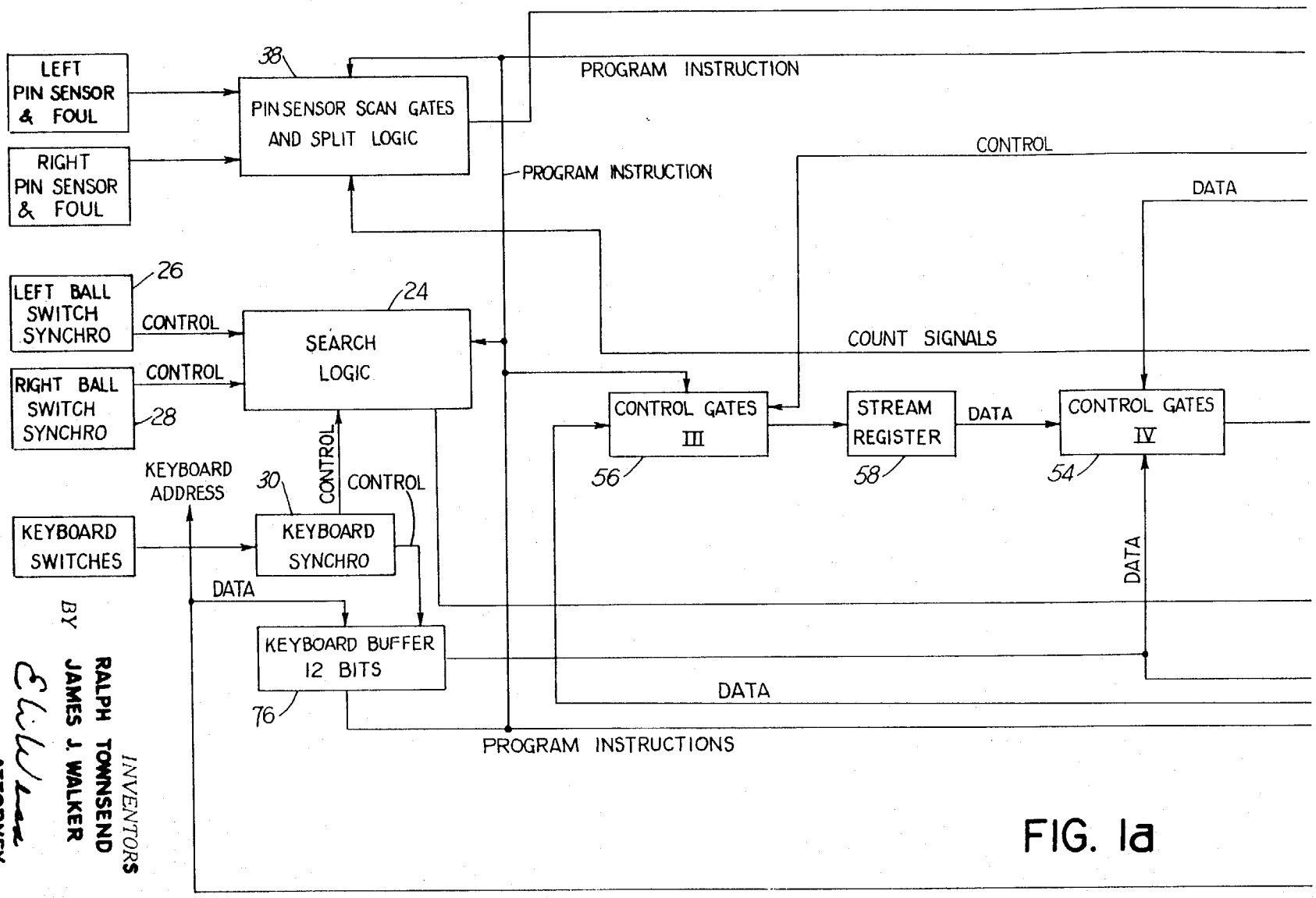
Figure 1B:
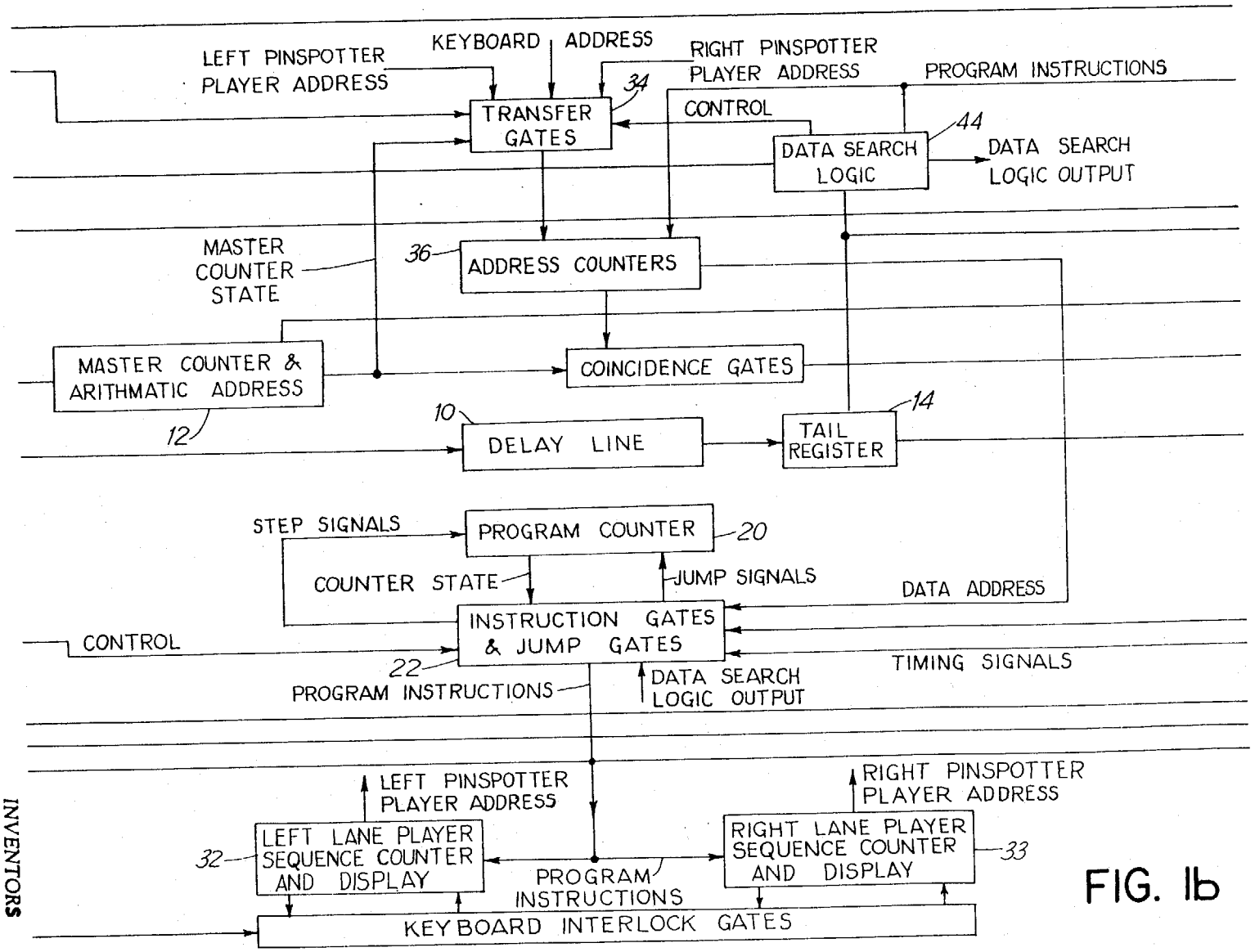

Referring to FIG. 1, there is illustrated, in block form, structure in accordance with the principles of this invention. A delay line 10 which can be a magnetostrictive delay line or the like stores the data received from the keyboard and the pinspotters. This data consists of a frame by frame account of the history of the game for each player bowling in addition to the marks, handicaps and blind score data associated with each team. The data is stored in the delay line 10 having a multitude of slot positions, one four-bit slot being assigned to each character in a frame. The master counter and arithmetic address 12 counts the bits as they emerge from the delay line 10 and contains the address of each four-bit character as it is fed to the tail register 14. The information representative of the history of the game is recirculated continuously through the delay line 10; the output of the delay line being fed through the tail register 14 and through control gates to the input of the delay line 10.

The information in the tail register 14 is fed to the display logic 16 which displays the received information on a cathode ray tube 18 in a predetermined sequence.

The display logic can be self-contained and, therefore, the display of data as it emerges from the delay line is independent of the computation of the scores of the players. Thus, as a game progress, the display will [ shown ] *show* the score of a player calculated up to the current frame from prior entries while the computer section can be in a rest state.

The state of the computer is determined by the program counter 20. The program counter 20 is a counter which counts either sequentially or in steps or jumps in accordance with instructions received from the instruction gates and jump gates 22. The program counter 20 and instruction gates and jump gates 22 [ directs ] *direct* the various subsections of the computer through a sequence of operation which enables the invention here disclosed to compute a bowling game score. If the program counter 20 is in its rest state, it will remain there until one of the input stations calls the computer.

The search logic 24 continually scans the inputs from the left ball switch synchronizer 26, the right ball switch synchronizer 28; and, the keyboard synchronizer 30. At the instant that the search logic 24 detects a signal from one of the input stations, it stops its scan of the inputs and feeds a signal to the instruction gates and jump gates 22 to leave the rest state and to direct the computer by the program instructions through the program required to perform the computations required. The program counter 20 sequences through its cycle and, upon returning to rest, signals the search logic 24 that it has performed the required computation. The search logic is then released and continues to scan the input lines.

Referring now to the receipt of input information from a pinspotter, it shall be assumed that a ball is delivered on the left lane of the two-lane pair served by the machine. The left ball switch synchronizer 26 detects the ball striking the back cushion and synchronizes the information from the pinspotter with the computer and signals the search logic 24. The player who delivered the ball will be the player that the left lane sequence counter and display 32 indicated as "up" for the left lane. When the search logic 24 detects this condition, it signals the instruction gates and jump gates 22, and the program counter 20 is directed to leave the rest state and proceed through the pinspotter entry program.

When the program counter 20 enters this program it transfers the contents of the left lane player sequence counter 32 through the transfer gates 34 into the address counters 36. The address counters 36 now contain the identity of the player who delivered the ball not the frame in which it was delivered or the actual ball delivered. The program instruction from the instruction gates and jump gates 22 then directs the pinsensor scan gates 38 to feed the count of the number of pins down into the input register 48 through the control gates 42. The data search logic 44 is directed to search through the memory contents of the delay line 10 for the player who has delivered the ball and establish the ball and frame identity. The data search logic 44 transfers this information into the address counters 36 which now [ contains ] *contain* the player, frame, and ball identity. When the identity of the entry is known, the program instructions direct the address counters 36 and [ strike spare ] *strike/spare* store and score conditions 46 to examine the ball content of the past two frames bowled by this player. The strike spare store and score conditions 46 determine if the scoring of the two prior frames depends upon the ball just bowled. For example, if the two frames prior to a first ball of a frame delivery were both strikes, the scoring of the two prior frames depends upon the data just acquired. If the second frame prior to the current frame requires the present ball data to complete it, the program instructions will direct the three-digit total for the third frame prior to the current frame to be transferred to the adder 48 and accumulator 50 through control gates 42.

The contents of the input register 49 which contains the number of pins felled by the present ball will now be added through control gates 42 and 52 to the total data for the third frame prior to the current frame stored in the adder 48 and accumulator 50. This correct score data for the second frame prior to the current frame is entered into the delay line 10 through control gates 52 and 54. At the time an entry is being made from the arithmetic unit, the normal path of data from the tail register 14 through the control gates 56 into the stream register 58 and delay line 10 through control gates 54, will be opened to accept new or additional information at control gates 56. Thus, whatever was in the delay line for the second frame prior to the current frame of the player who delivered the ball will be replaced by the new information. This process will be repeated for the first frame prior to the present frame and for the present frame each time the strike spare store and score conditions 46 determines the pinfalls to be added to the frame being scored. Hence, it is seen that any pinspotter entry can effect two prior frames and the computer program accommodates this condition.

In addition to computing the score for the player who has just bowled, this invention computes the new team marks total for the current frame. To compute the new team marks total, the program instructions directs the data search logic [ 24 ] *44* to reset the current frame address into the address counters 36 through the transfer gates 34 and to set the player section of the address counters 36 to the first player on the team for which a ball delivery has been made. The program instructions then direct the [ strike spare] *strike/spare* store and score conditions 46 to establish the number of marks that the first player on the team has in the current frame. This operation requires the ball data for both the present and previous frame since the action in the frame immediately preceding the current frame influences the number of marks to be credited to the current frame for a given player. For example, a strike in the frame immediately preceeding the current frame followed by a strike in the current frame will cause two marks to be given for the second strike rather than one. The procedure of marks calculation is repeated for each player on the team by indexing the address counters 36 after the current frame marks have been computed for a given player. The frame marks for a team are accumulated in the adder 48 and accumulator 50 as the program instructions index the address counters 36 and direct the [ strike spare ] *strike/spare* store and score conditions 46 to transfer the number of marks for each player through control gates 42.

During team play, when the fifth player's frame marks are calculated and added to the frame marks of the previous four players, the program instructions transfer the contents of the accumulator 50 and adder 48 into a nondisplayed set of slot positions in the delay line 10. This transfer occurs as before, the information signals passing through control gates 52 and 54 while control gates 56 close the tail register 14 to the receipt of signals from the stream register 58 thus replacing any old marks data with the new information calculated.

When the current frame marks have been entered, the program instructions set the frame section of the address counters 36 to the first frame and the line section to the sixth line. The marks handicap is gated into the adder 48 and accumulator 50 through control gates 42 and the contents of the frame marks slot positions are directed by the program instructions through control gates 42 to be added to the handicap previously stored in the adder 48 and accumulator 50.

This total is then inserted into the visible marks position for the first frame and the process is continued, one frame at a time, each time adding the number of marks for the frame to the total accumulated marks and transferring the contents of the accumulator 50 to the visible marks slot position for the frame. The transfer of the marks totals is a nondestructive transfer in that the contents of the accumulator 50 and adder [ 49 ] *48* are circulated back into the accumulator 50 and adder [ 49 ] *48* thru control gates 42 and 52 while being transferred into the delay line 10 thru control gates 54. When the instruction gates and jump gates 22 detect that the last-bowled frame has been reached, the gates direct the program counter 20 to the remainder of the score calculation program.

The last frame bowled is detected by the data search logic 44 which examines the ball content of all players for the frame in which the marks are being calculated. When it is found that no player has completed this frame, the data search logic 44 signals the instruction gates 22.

It is seen that the above-described steps of score calculations accommodate the marks and scoring portion of the machine requirements but does not include the operations required for the superstition factor and team score totaling.

Figure 4:
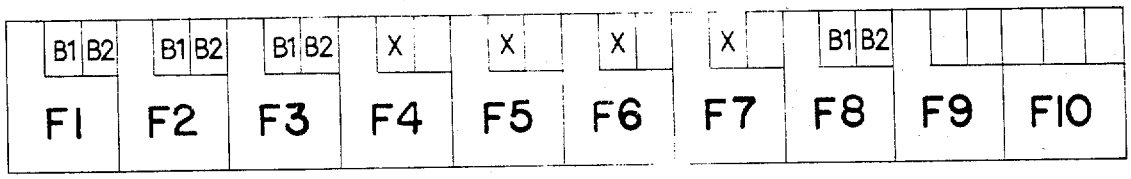
FIG. 4 is a view of FIG. 3 illustrating frames one through nine of a single player.

In addition to the sections of the program which exists to calculate score and marks for a pinspotter entry, a section of program exists to insert a code bit into a code word associated with each frame for a player. This code bit directs the Display logic 16 to either blank or display the total data associated with the frame. If the frame is a member of an unbroken strike string, the total will not be displayed. For example, if a player has bowled the first three frames without scoring a strike, but bowls strikes in frames four through seven, the display bits will be inserted in the code words for frames four through seven and these totals when computed will not be displayed. If the player breaks the string of strikes in the eighth frame, the code bit will direct the display logic 16 to display the totals for frames one through eight. The display bit section of the program determines the steps required. The player section of the address counters 36 contains the identity of the player who has delivered the ball. This player address is not changed during score calculation. At this time in the program (after score calculation but before marks calculation) the display bit for the superstition factor is calculated. During this procedure, the program instructions directs the data search logic 44 to search the ball content from the first frame for the player who has bowled. When the data search logic 44 detects that a frame has been bowled which is not a strike, it transfers the address of this frame into the frame section of the address counters 36 through the transfer gates 34. The program instructions then inserts the display bit causing frames one through to the frame found to be displayed. The frame section of the address counters is indexed forward and the search is again initiated starting at the current frame address in the address counters 36. To illustrate the action of this section of program consider the original example which is illustrated in FIG. 4.

Using the above description of the data search logic 44 during the display bit section of the program, it is seen that the first frame found which is not a strike is the first frame F1. This frame address is transferred through the transfer gates 34 to the address counter [ 46 ] *36*. The control gates 56 are then instructed to write a display bit in the code word for the first frame causing it to be displayed. The address counter 36 is now indexed to the second frame F2 and the data search logic 44 beings to search for a frame which is not a strike starting at the second frame F2. The second frame is then found not to have a strike. Again, the transfer will occur and a display bit will be inserted into the control word for the second frame F2. Similarly, the third frame F3 will be displayed. When the address logic is set for the fourth frame F4, it is seen that no frame can be found beginning at the fourth frame F4 which is not a strike and, therefore, a display bit will not be inserted into the code word from the fourth frame onward to cause the superstition factor to be observed. This assumes that the eighth frame F8 has not been bowled. Assume now that the eighth F8 is bowled and is not a strike as shown. When the address counter 36 is set at the fourth frame F4 and the search begins, the eighth frame F8 will be found and transferred to the address logic. The program instructions will then direct control gates 56 to insert a display bit into the control word from the last found displayable frame to the frame now in the address counters 36 (the eighth frame) to cause the scores for frames one through eight to be displayed.

Referring now to the computation of a team total, the program used is actually a part of the score calculation program previously described. As mentioned previously, during a pinspotter entry the data search logic 44 locates the frame in which the ball is delivered. If the frame found is the 10th frame F10, the score will be computed as described and the status of the tenth frame will be examined. If the 10th frame is complete and the player has, therefore, finished his game, the strike spare store and score conditions 46 circuitry will signal the instruction gates 22. The program counter 20 will then be directed through the total calculation portion of the pinspotter entry program. The first action of this section of program is to transfer the team handicap from its section in the delay line 10 thru control gates 42 into the adder 48, accumulator 50, and input register 49. The program instructions then sets the address counters 36 to the first player, 10th frame, and directs this data to be added to the handicap. The total for the first player is circulated through the adder [ 44 ] *48* along with the existing handicap. Control gates 42 and 52 control this circulation and addition in accordance with the program instructions received by these units. The total of the first player's score plus the handicap is now contained in the adder 48, accumulator 50 and input register 49. The program instructions now index the address counters 36 to the second player and directs his total to be added to the existing total. This process is continued until it is detected that all five players of the team have had their totals added to the team handicap. Note that if any of the players have not completed the game, their 10th frame total will be zero and hence, when it is added as described, it will not change the totals in the registers. After accumulating the team total, this data is directed into the delay line 10 through control gates 52 and 54 while control gates 56 close to block the flow of information to the tail register 14 from the stream register 58 to replace any existing total data by the new data.

The remaining action of the computer is to check the [ strike spare ] *strike/spare* store and score condition 46 subsection to establish if the ball delivered completes the frame for the player "up" on the left lane. If this is so, the program instructions index the player sequence counter 32.

It is assumed that the left-lane player sequence counter 32 is indexed to the next player "up" on the left lane. Upon completion of the program, the program counter 20 returns to the rest state and signals the search logic 24 to resume its search of the input synchronizers; the keyboard synchronizer 30, the right ball switch synchronizer 28 and the left ball switch synchronizer 26.

In this invention, four types of information can be manually entered through the keyboard. These entries are as follows:

1. Team marks handicap entry
2. Team handicap entry
3. Player blind score entry
4. Pinfall entry Again the operation of the machine will be described for each of the types of entries above.

Figure 2:
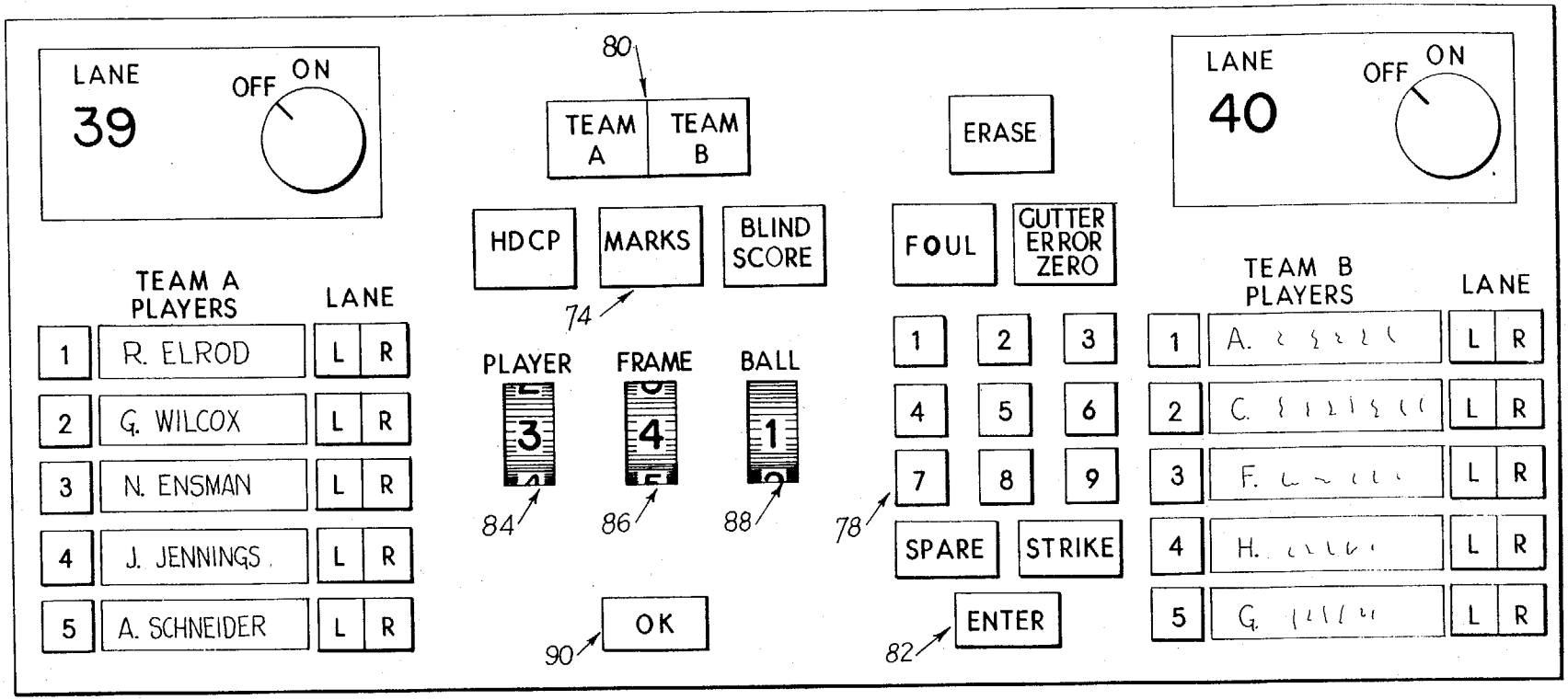
FIG. 2 is a view of the bowler's console or keyboard.

Referring now to the operation of this invention during a keyboard marks entry, when the marks switch 74 on the keyboard illustrated in FIG. 2 is depressed, the keyboard synchronizer 30 detects this action and sets itself to a state which opens the entry gates to the keyboard buffer 76. The opening of these gates allows any entry made on the keyboard number switches 78 to be loaded into the keyboard buffer. Assume that a marks handicap of 25 is to be entered for Team A. After setting the team switch 80 to A by depressing the team A button and depressing the marks switch 74 as described, the number switches can be actuated. When the number two is pressed, it is loaded into the first four-bit slot in the keyboard buffer 76. The number five is then pressed and the keyboard synchronizer 30 detects this to first shift the contents of the keyboard buffer 76 four bits to the left (toward the most significant digit position of the keyboard buffer); and, the five is then entered into the first four-bit slot of the keyboard buffer 76. The keyboard buffer 76 now contains the desired marks handicap. At this time the entry switch 82 is depressed to signal the keyboard synchronizer 30. The synchronizer then locks out any further entry from the keyboard and calls the search logic 24. Shortly thereafter, the search logic will detect that the keyboard is calling and lock on to the keyboard. When the search logic recognizes the keyboard, it will signal the instruction gates 22 of the type of entry found and the program counter is driven off rest and into the keyboard marks entry program.

The first action of this program is to transfer the team address into the address counters 36 through the transfer gates 34. When the marks storage position for Team A appears in the master counter and arithmetic address 12, the program instructions will direct the contents of the keyboard buffer 76 to be transferred, through control gates 54, into the storage slot position in the delay line 10 for Team A marks. The program counter 20 is now directed through part of the previously described marks calculation program. The section of program utilized is the marks accumulation section. In this portion the team marks handicap is transferred into the adder 48 and accumulator 50 and the address counters 36 are set to the sixth line, frame one. The frame one marks are transferred into the adder 48 and added to the existing marks handicap. This total is placed in the visible frame marks slot position for frame one and is also circulated back into the adder 48 and accumulator 50. The frame marks total for the subsequent frames are added and displayed until the last frame bowled is reached. The program counter then returns to rest, releases the search logic and resets the keyboard synchronizer 30. The necessity of going through the marks accumulation can be seen if it is assumed that the marks handicap can be changed at any point in the game, hence if a marks calculation has proceeded this entry, the change of the handicap will change all the marks totals. If no frames have been bowled as would be the case for the beginning of a game, the marks handicap only will be inserted into the first frame marks display slots.

Referring now to the entry of a keyboard handicap, its entry begins in the same manner as a marks handicap entry. A team is first selected by means of the team switch 80 and then the desired multidigit handicap is inserted by means of the number switches 78. The action of the keyboard synchronizer 30 and keyboard buffer 76 is identical to that described for the keyboard marks entry. When the desired handicap is entered, the enter switch 82 is actuated and the keyboard synchronizer 30 signals the search logic 24 that a keyboard entry is to be made. When the search logic 24 scans the keyboard synchronizer 30 input it recognizes the keyboard and informs the instruction gates and jump gates 22 that a keyboard handicap entry is being made. The instruction gates drives the program counter 20 from its rest state into the keyboard team handicap program. The program instructions transfer the team address into the address counters 36 and forces these counters to the address of the handicap storage slot position. The keyboard buffer 76 is then directed to shift its contents through control gates 54 into the handicap storage slot. The program counter 20 is now directed through the total accumulation program previously described for a pinspotter entry. Hence, when a handicap is entered it is added to any exiting 10th frame totals. Again, this procedure is required as a handicap entry can be made at any time during a game. When the program counter 20 completes the handicap program it returns to rest, releases the search logic 24 and allows it to scan the input lines for the next entry.

The entry of a players blind score is similar to the entry of a team handicap. When the enter switch 82 is actuated the search logic 24 signals the instruction gates 22 that a player's blind score is to be entered. The program counter leaves the rest position and advances to the blind score entry program. The program instructions transfer the address of the player and team from the player switch into the address counters 36 through the transfer gates 34 and also directs the frame section of the address to the 10th frame. The blind score is entered and the program goes through the score total procedure previously described. When the score totaling has been completed the search logic is released and the program counter returns to its rest position. The totaling procedure is required as a blind score may be entered or changed at any point during a game.

When an entry of pinfall is desired from the keyboard, the identity of the player, frame and ball is first set on the player, switch 84, frame switch 86, and ball switch 88. The OK switch 90 is then actuated and signals the keyboard synchronizer 30 that a pinfall entry is to be made. The synchronizer detects this condition and allows any subsequent occurring one digit number data to be loaded into the first four-bit slot of the keyboard buffer 76. If several number switches are pressed in sequence, then only the last entry is stored in the keyboard buffer 76. When the enter switch 82 is actuated, the keyboard synchronizer 30 calls the search logic 24. The search logic 24 signals the instruction gates 22 that a pinfall entry is to be made. The instruction gates 22 directs the program counter to advance from the rest position to the keyboard pinfall entry program. The program instructions transfer the player, frame and ball address into the address counters 36 through the transfer gates 34. The ball data is then transferred through control gates 42 into the input register [ 48 ] *49* . The program instructions then proceed to step through the program for the pinspotter entry for calculating frame score. The frame section of the address counters 36 is then indexed forward and the data search logic 44 is directed to test if the next frame has been bowled. If the next frame has been bowled, the frame-scoring routine is repeated to update the frame to the right on the basis of the new data received. The procedure of checking the next frame after computing a frame score is continued until either the 10th frame or an empty frame is reached. Hence, an entry earlier in the game will update the entire game for player. When the frame-scoring program is completed, the totaling program is called if necessary. After totaling the keyboard marks scoring program is initiated.

To calculate the new marks score on the basis of the edit, the program instructions transfer the frame address back into the address counters 36 from the frame switch 86. The marks are recalculated for this frame using the marks calculation program previously described. The frame section of the address counters 36 is then indexed forward to the next-appearing frame and the marks program is repeated. This is necessary since an edit in a particular frame N can change the marks for frame N+1. For example, if frame N+1 is a strike and frame N is changed to a strike, then the strike in frame N+1 will be worth two marks. Thus, a keyboard pin fall input will result in the recalculation of all changes brought about by that entry.

When the keyboard program is complete the program counter returns to its rest condition and releases the search logic 24.

In this invention a magnetostrictive delay line or the like is used as a storage means. Data that is to be stored in the line is in the form of a four-bit word for each character stored. The information contained within a single bowling frame consists of six characters for each frame one through nine; and eight characters for the 10th frame. The characters associated with frames one through nine are as follows:

Information Character I
Ball One Pinfall B1
Ball Two Pinfall B2
Least Significant
Frame Total Digit T1
Second Most Significant
Frame Total Digit T2
Most Significant
Frame Total Digit T3

The characters associated with the 10th frame are the same as those noted above except that an additional ball B3 is required and one additional total digit T4 is allocated to the 10th frame. The T4 digit is required for the sixth line, 10th frame, only to display team totals. However, for consistency, each 10th frame is allocated the T4 digit.

Figure 3:
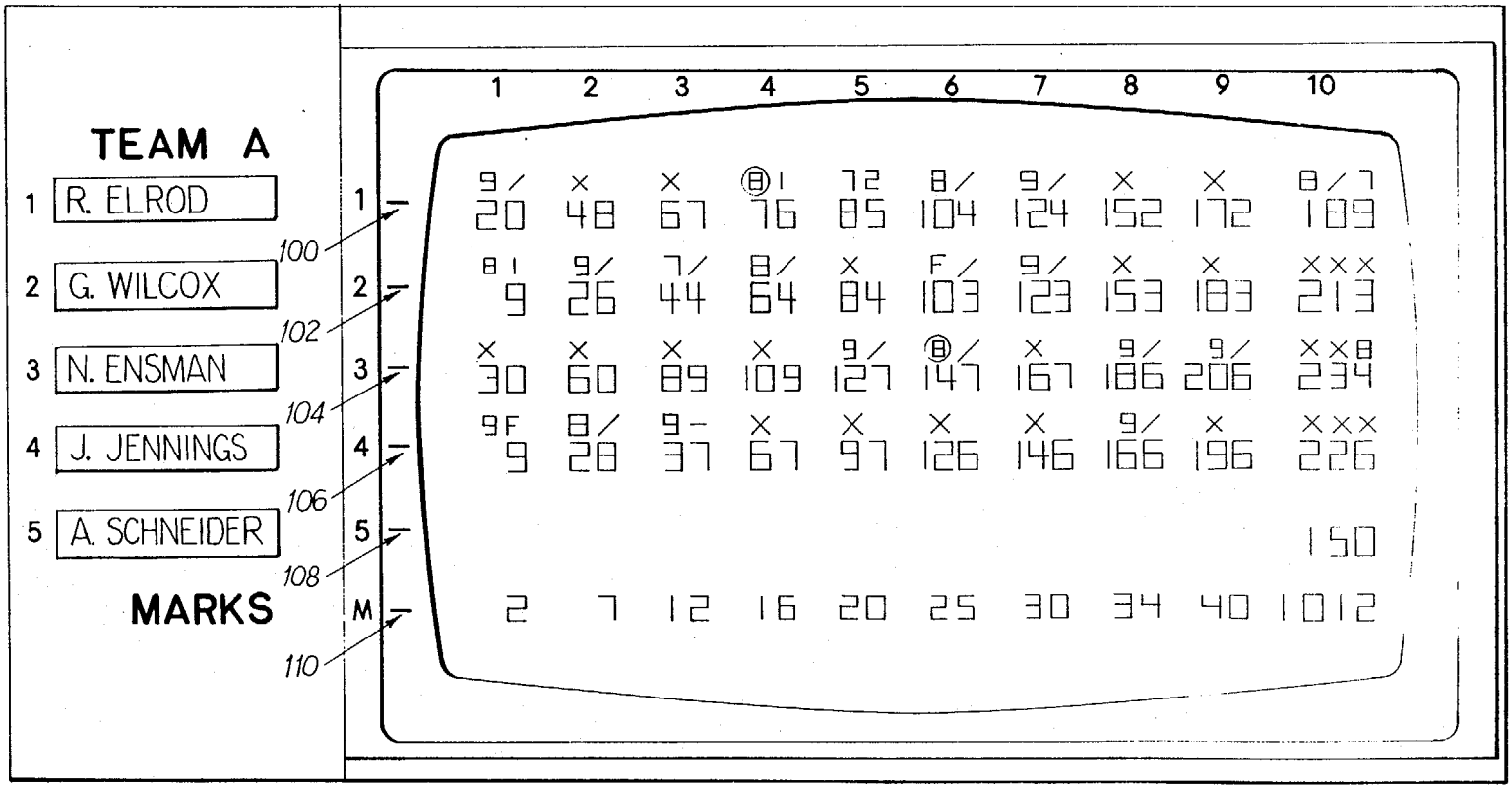
FIG. 3 is a view of a cathode-ray tube display in accordance with the principles of this invention.
Figure 5:
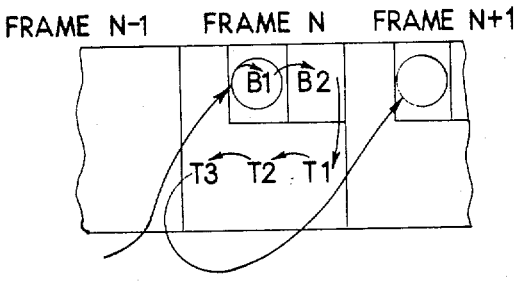
FIG. 5 is a view of a single frame of FIG. 3 representative of frames one through 9.

The data within the delay line is fed to and displayed by a cathode-ray tube as illustrated in FIG. 3. Referring to FIG. 5, there is illustrated a single frame of the display of FIG. 3 for frames one through nine; and, referring to FIG. 6, there is illustrated a single frame of the display of FIG. 3 for the 10th frame.

Figure 6:
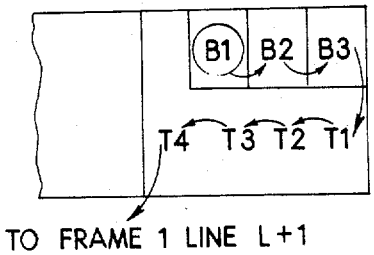
FIG. 6 is a view of a single frame of FIG. 3 representative of the 10th frame.

Referring to FIG. 5, in this invention, the display logic includes split symbol generating means coupled to the cathode-ray tube so that the cathode-ray tube writes a circle around the ball one pinfall B1, and then proceeds to write ball one pinfall B1, ball two pinfall B2, frame total digit T1, frame total digit T2 and frame total digit T3 before beginning the writing of the information in the next occurring frame. The circle around B1 will be displayed only when the player has a split in that frame. The information character associated with each frame contains this split information as well as a display bit signal which determines whether the total consisting of the numbers T1, T2, T3, should be displayed. The total format of displayed data consists of six lines per tube. Referring to FIG. 3, lines 100, 102, 104, 106 and 108 display the score and pinfall for the players displayed. Line 110 displays the marks data for the frame in the T1 and T2 positions. Line 110, frame 10 displays the team total consisting of the numbers B1, B2 and B3 in addition to T1, T2, T3 and T4 as illustrated in FIG. 6.

The cathode-ray tube display, in the configuration shown in FIG. 3, includes the numerals one (1) through ten (10) positioned, respectively, above the corresponding bowling frames to indicate the number of the frame in accordance with the rules of the game of bowling.

All of the information in the delay line 10 is normally displayed on the face of the cathode-ray tube. FIG. 3 illustrates the history of a game for five players played to completion.

If the information to be displayed is examined, it would appear that the data emerges sequentially from the delay line in the form following:

L1F1I, L1F1B1, L1F1B2, L1F1T1, L1F1T2, L1F1T3, F1F2I, etc.

where L1 represents Line 1 or Player 1; and F1 represents Frame 1

This, however, is not the case as an interlace pattern is required to have a delay line of reasonable length.

The necessity of an interlace can be seen if it is assumed that the circuitry forming the characters can operate no faster than 24 $\mu$sec. per character, and as 744 characters are required to display the information on two tubes (one for each lane) the length of the delay line would be $T_L=744\times24\times10^{16}$ or 17.9 msec. long. A line having this length is difficult to construct and difficult to use as signal attenuation becomes troublesome. The operating frequency of this assumed line is determined by the expression $$f_b=/T_b \text{ and } T_b=24\ \mu\text{sec.}/4=[\text{bus/bit}]\ 6\ \mu sec./bit$$

Assume that the operating frequency of the line is raised but the time distance between sequential characters remains the same as the display cannot process the information in less 24 $\mu$sec. Increasing the operating frequency causes the occurrence of a space after L1F1I appears and before L1F1B1 emerges. If subsequent data is written, or interlaced, in the space, the length of the line can be decreased. To accommodate the display requirement for the information to be present for 24 $\mu$sec., the contents of the tail register 14 can be transferred to the display logic 16 every 24 $\mu$sec., when the next character to be displayed emerges.

The interlace used in the practice of this invention to shorten the line is as follows:

[ L1F1I ] *L1F1I,* L2F1I, L3F1I, L4F1I, L5F1I, L6F1I,

[ L7F1I ] *L7F1I,* L8F1I, L9F1I, L10F1I, L11F1I, L12F1I,

[L1F1B1, L2F1B1 L12F1B1] *L1F1B1, L2F1B1—L12F1B1,* L1F1B2, and so on, where:
lines 1–6 (L1–L6)
are for Team A (Tube 1) and,
lines 7–12 (L7–L12)
are for Team B (Tube 2).

If the delay line frequency is assumed to be IMC it is seen that the underlined characters in this interlace are spaced at 24 μsec. intervals, the spacing being taken from the end, or last bit, of a character to the last bit of the next character as the information is not usable in the tail register 14 until all four bits have been entered. If the interlace is examined, it will be seen that a given frame and character a grouping exists such that the character emerges for the 12 display lines in ordered sequence. Hence, if we treat the designations I, B1, B2, etc. as the ordered group of characters for all lines, the interlace can be rewritten as follows:

F1I, F1B1, F1B2, F1T1, F1T2, F1T3, F2I, F2B1, [F2B2, F10I] *F2B2—F10I*

F10B1, F10B2, F10B3, F10T1, F10T2, F10T3, F1054. Note that the line designation (LN) is omitted as each character group contains the data for all lines.

The display logic selects the ordered character in each group in accordance with the line being displayed. Hence, on each pass of the delay line the character selected will be indexed by one (i.e., for line one the display logic selects the first and seventh characters in the group, for line 2 the second and eighth, etc.) The characters emerging at a 24 μsec. spacing alternate between the two cathode-ray tubes and, therefore, the display of the characters alternate. This push-pull type of arrangement of tube display provides a 24 μsec. time duration to position the beam for a given tube while the other tube is writing a character. The beam positioning information is derived from the master counters 12 which contain the address of the character emerging from the delay line. This character address is transferred to the display logic 16 and positions the beam through analog decoding gates. The beam can be positioned to the next character to be written while the opposing tube is writing to provide a maximum time duration for the transients in the positioning amplifiers to subside.

In this invention, the beams for the two cathode-ray tubes are alternately controlled to display the characters. When the beam is in position and the tube is to display a character, the beam is unblanked and driven by the display logic through a position character generation pattern.

Figure 7:
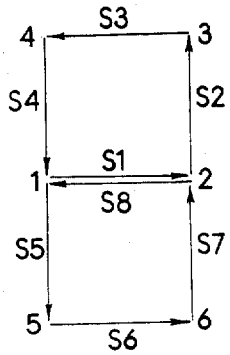
FIG. 7 illustrates the matrix used for the generation of characters on the face of a cathode-ray tube.

The method of character generation is the seven-stroke technique. Referring to FIG. 7, the beam is carried through positions 1 to 2 via stroke S1, 2 to 3 via stroke S2, 3 to 4 via stroke S3, 4 to 1 via stroke S4, 1 to 5 via stroke S5, 5 to 6 via stroke S6, 6 to 2 via stroke S7, and 2 to 1 via stroke S8. If, now, the beam were to be normally "on," the [FIG. 8] *figure 8* would always be generated. Assuming stroke S1 is always blanked, strokes S2 through S8 are the active strokes (seven strokes). All digits can now be created by selectively blanking the proper strokes. For example, if strokes S4 and S7 were blanked the [FIG.] *figure* generated would be a 5, if strokes S2 and S7 were blanked the [FIG.] *figure* 3 would be generated.

In some instances it may be desirable to have a permanent record of the history of the game bowled. In those instances, the data signals fed from the delay line 10 to the display logic 16 can also be fed through a matching matrix to a tape recorder means. The recorder means can be a punched tape, a magnetic tape or the like. In this manner the information within the delay line can be stored permanently. When, at some time in the future the history of the game is to be reproduced, the information on the tape is fed back into the delay line through a matching [material] *matrix* and the information in the delay line is then fed to and controls the display on the cathode-ray tube. Thus, at any particular instant, and when desired, the complete history of the game can be reproduced.

In the operation of this invention, the sequence of operations of the various desired cycles or procedures can be as follows where, of the various steps noted, Step 0 is a rest condition;

Steps 1 through 8 and 10 relate to keyboard entry;

Steps 11 through 19 relate to pinspotter entry; [11 through 19 relate to pinspotter entry;]

Step 20 relates to printing;

Steps 21 through 37, 40 and 42 relate to point score calculations;

Steps 38 and 39 relate to accumulating 10th frame totals including points handicap;

[Steps] *Step* 41 relates to testing for end of game of a player;

Steps 43 through 46 relate to superstition factor display and suppressing display of score of a strike string;

Steps 9 and 47 through 55 relate to marks calculations;

Steps 56, 57, and 58 relate to suppression of zero to left of most significant figure for marks;

Step 59 relates to clearing of step and logic result;

Step 60 relates to entering marks handicap into delay line; and

Step 61 relates to entering points handicap into delay line.

---

ENTERING INFORMATION FROM KEYBOARD

| STEP: | |
|---|---|
| 0 | Test entry for pinspotter [inpnt] *input*, if yes-advance to step. 14. or keyboard input-advance to step 1. |
| 1 | Test for marks handicap entry key depressed, if yes-advance to step 60. |
| | Test for points handicap entry key depressed-if yes-advance to step 61. |
| | Test for blind score handicap entry key depressed, if yes-advance to step 37. |
| | Test for ball entry edit, if yes-advance to step 2. |
| 2 | Test keyboard switch to indicate: |
| | Ball 1, if yes-advance to step 3. |
| | Ball 2, if yes-advance to step 4. |
| | Ball 3, if yes-advance to step 8. |
| 3 | Enters Ball 1 into delay line and advance to 20. |

ENTERING INFORMATION FROM KEYBOARD

4 Enter Ball 2:
If Ball 2 is spare, advance to step 7.
If Ball 2 is not spare, advance to step 5.

5 Test to determine if Ball 1+Ball 2=spare:
Add Ball 1 to Ball 2.
Test if Ball 1+Ball 2 is equal to 10, advance to step 6.
Test if Ball 1+Ball 2 is less than 10, advance to step 7.

6 Ball 1+Ball 2=10, is a spare even though spare key was not depressed, advance to step 7.

7 Enter ball 2 into delay line and advance to step 20.

8 Test:
Is keyboard set for Frame 10, if yes-advance to step 10.
Is keyboard not set for Frame 10, if yes-advance to step 59.

9 Use Data Search Logic 44 to find last frame with no entry for all players, advance to step 55.

10 Enter Ball 3 into delay line and advance to step 20.

11 Count pins down as indicated by pinspotter transfer line and team frame player sequence counters.
Search delay line for next appearing open frame for particular player and team.
Test for foul, if present-advance to step 15.
Test is not a [fonl] *foul;* not Ball 1 and is frame 10 (Ball 2 or 3 in frame 10) and is frame 10, advance to step 12.
Test is not a foul; is not Ball 1; and is not frame 10, advance to step 13.
Test, is Ball 1, advance to step 15.

12 Test for following conditions:
Ball 2 and Ball 1 is not a strike, advance to step 13.
Ball 2 and Ball 1 was a strike, advance to step 15.
It is Ball 3 and Ball 2 was a spare, advance to step 15.
It is Ball 3 and Ball 1 is a strike and ball 2 is a strike, advance to step 15.
It is Ball 3 and Ball 1 is a strike and Ball 2 is not a strike, advance to step 13.
No Ball (game finished and extra ball rolled) advance to step 59.

13 Test for pins down:
If 10 down, advance to step 14.
If it is Ball 2 and not 10 pins down, advance to step 16.
If it is Ball 3 and not 10 pins down, advance to step 17.

14 Convert pinfall to spare code, advance to step 15.

15 Enter pinfall into proper position in delay line and if there was a split, enter split indication, advance to step 20.

16 Substract Ball 1 from total pinfall to obtain Ball 2 pinfall, advance to step 19.

17 Substract Ball 2 total pinfall to obtain Ball 3 pinfall, advance to step 18.

18 Enter Ball 3 pinfall into proper position in delay line, advance to step 20.

19 Enter Ball 2 pinfall into proper position in delay line, advance to step 20.

20 Activate printer and print on permanent record and print Pinfall, Frame, Ball, Player, advance to step 21.

21 Set strike spare store (46) for current frame, feed ball 1 pinfall to input register 48; step back address counter 36 to next preceeding frame, advance to step 22.

22 Set strike/spare store (46) for frame preceeding current frame, step back address counter 36 to second frame preceeding current frame, advance to step 23.

23 Set strike/spare store (46) for second frame preceeding current frame, step back address counter 36 to third frame preceeding current frame, advance to step 24.

24 Feed frame score for third frame preceeding current frame to adder 48 and accumulator 50; and step address counter 36 forward to second frame preceeding current frame, advance to step 25.

25 Add zero, 20 or 30 as determined by strike/spare store and score conditions 46 to second frame preceeding current frame, advance to step 26.

26 Add Ball 1 pinfall or zero as determined by strike/spare store and score conditions 46 to second frame preceeding current frame and enter into delay line, advance to step 27.

27 Obtain from delay line frame score for second frame preceeding current frame and step address counter 36 to frame immediately preceeding current frame, advance to step 28.

28 Add zero, 10, or 20 as determined by strike/spare store and score conditions 46 to second frame preceeding current frame, advance to step 29.

29 Add Ball 1 pinfall or zero as determined by strike/spare store and score conditions 46 to second frame preceeding current frame and step address counter 36 to current frame, advance to to step 30.

30 Add Ball 2 pinfall or zero as determined by strike/spare store and score conditions 46 to second frame preceeding current frame and step address counter 36 back to frame immediately preceeding current frame, advance to step 31.

31 Enter score for frame preceding current frame into proper position in delay line, advance to step 32.

32 Obtain from delay line frame score for frame preceding current frame and step address counter 36 to current frame, advance to step 33.

ENTERING INFORMATION FROM KEYBOARD

| | |
|---|---|
| 33 | Add zero, 10 or 20 as determined by strike spare store and score condition 46 to frame preceeding current frame, advance to step 34. |
| 34 | Add Ball 1 pinfall or zero as determined by strike/spare store and score conditions 46 to frame preceding current frame, advance to step [36] 35. |
| 35 | Add Ball 2 pinfall or zero as determined by strike/spare store and score conditions 46 to frame preceding current frame:<br>Test if current frame is frame 10, advance to step 36.<br>Test if current frame is not frame 10, advance to step 40. |
| 36 | Add Ball 3 pinfall or zero as determined by strike/spare store and score conditions 46 to frame preceding current frame and enter score (frame 10) into appropriate position in delay line, advance to step 37. |
| 37 | Clear adder 48, input register 49 and accumulator 50. Test if end of game; if yes, set address counter 36 to line 1 (1st player), advance to step 38.<br>If no, advance directly to step 43. |
| 38 | Add all tenth frame totals together and test for fifth player, advance to step 39. |
| 39 | Add handicap to total of all tenth frames and enter into total position of delay line, advance to step 41. |
| 40 | Enter score in proper position in delay line, advance to step 41. |
| 41 | Step address counter 36 to subsequent (next) occurring frame:<br>Test if end of game, advance to step 43.<br>Test if not end of game, advance to step 42. |
| 42 | Test if subsequent frame after current frame is empty:<br>If subsequent frame is empty, advance to step 43.<br>If subsequent frame is not empty, advance to step 21. |
| 43 | Insert "no display" bit into delay line for a given player for all ten frames.<br>Set address counter 36 to frame 1, advance to step 44. |
| 44 | Data search logic 44 sets address counter 36 to next occurring frame which does not have a strike:<br>(A) Frame found does not have a strike and is empty, advance to step 47.<br>(B) Frame found does not have a strike and is not empty and is not frame 10, advance to step 45.<br>(C) Frame found does not have a strike and is not empty and is frame 10, advance to step 46.<br>(D) Frame found is 10th frame and is bowled out, advance to step 46.<br>(E) No frame found and not end of game, advance to step 47. |
| 45 | Insert display bit into delay line for player from first frame to first occurring frame having no strike and step address counter 36 to next frame after first occurring frame having no strike, advance to step 44. |
| 46 | Insert display bit into delay line for player for frames one through ten, advance to step 47. |
| 47 | Search for current frame, advance to step 48. |
| 48 | Set address counter 36 to line 1 (1st player) and clear team marks total for each frame:<br>Test if address counter 36 is on frame 10, advance to step 9.<br>Test if address counter 36 is not on frame 10, advance to step 49. |
| 49 | Step address counter back to frame preceeding current frame position and clear strike/spare, store and score conditions 46, advance to step 50. |
| 50 | Set strike/spare, store and score conditions 46 for frame preceeding current frame; step address counter 36 to current frame, advance to step 51. |
| 51 | Add Ball 1 to Ball 2 of current frame; and, set strike/spare store and score conditions 46 for current frame for Ball 1 less than 5 or Ball 1+Ball 2 is less than 5, advance to step 52. |
| 52 | Set strike/spare store and score conditions 46 for current frame for strike or spare in current frame. Obtain frame marks total for team, advance to step 53. |
| 53 | Add marks score as determined by strike/spare store and score conditions 46 of each player-one at a time-to frame marks total. Step address counter 36 to next line; test if it is not line 5, advance to step 49.<br>If it is line 5 and have examined each player once and it is a keyboard entry, advance to step 54.<br>It is line 5, and is a pinspotter entry or it is line 5 and a keyboard entry and have examined all players subsequent frame advance to step 9. |
| 54 | Step address counter 36 to next frame after current frame, advance to step 48. |
| 55 | Insert team frame marks into accumulator 50, add together team frame marks for each frame and keep in adder 48 and input register 49. Enter into delay line cumulative frame marks total for all frames stopping at first frame which has incomplete score from any player, advance to step 56. |
| 56 | Set address counter 36 to frame 1, advance to step 57. |
| 57 | Suppress most significant zero or zeros, advance to step 58. |
| 58 | Test for frame 10 and step address counter forward to next frame:<br>If next frame is frame 10, advance to step 59.<br>If next frame is not frame 10, advance to step 57. |
| 59 | Clear data search logic 44 and strike/spare store and score conditions 46 step appropriate (left or right) player sequence counters 32 or 33 to next active player, advance to step 0. |
| 60 | Enter marks handicap into delay line, advance to step 9. |
| 61 | Enter points handicap into delay line, advance to step 37. |

Obviously, many modifications and variations of the present invention are possible in the light of the above teachings. It is, therefore, to be understood that within the scope of the appended claims the invention may be practiced otherwise than as specifically described.

What we claim is:

1. In an automatic bowling scorer for presenting a visual display of the history of a game of bowling comprising a cathode-ray tube having a display face, circuit means for controlling the cathode-ray tube so that the display face of the cathode-ray tube is divided into discrete areas representative of the [ frame ] *frames* of a game of bowling for at least one player, first means [ associated with the face of the cathode-ray tube ] adjacent said discrete areas to identify the player associated with the discrete areas representative of the frames of the game, and second means [associated with said display face of the cathode-ray tube] *adjacent* with said display face of the cathode-ray tube] *adjacent said discrete areas* to identify the frame each discrete area represents.

2. The combination as defined by claim 1 wherein said first means comprises an area for displaying a players name and said second means comprises numbers one through ten to identify the 10 frames of the game of bowling.

3. The combination as defined by claim 2 including display logic means coupled to said cathode-ray tube *to constrain the latter* to indicate pinfall and total for each frame.

4. The combination of claim 3 wherein said display logic means includes strike symbol generating means and spare symbol generating means.

5. The combination of claim 4 wherein said display logic means includes split symbol generating means.

6. An automatic bowling scorer for presenting a visual display of the history of a game of bowling comprising a cathode ray tube having a display face, circuit means for controlling the cathode-ray tube so that the display face of the cathode-ray tube is divided into discrete areas representative of the various frames of a game of bowling for at least one player, signal-generating means coupled to generate signals representative of the number of pins felled by a ball, calculating means fed by said signal generating means to compute total score from the signals representative of the number of pins felled according to the rules of the game as the game progresses frame by frame, and display logic means fed by said calculating means to drive said cathode-ray tube to display the score history of the game frame by frame.

7. The combination of claim 6 wherein said calculating means includes a memory means to store the signals representative of pinfall for the various frames.

8. The combination of claim 7 wherein said memory means comprises a recirculating delay line.

9. The combination of claim [ 8 ] *7* including means fed by said calculating means to record permanently the history of the game bowled.

10. The combination of claim [ 8 ] *7* including means to selectively enter pinfall for a ball of a desired frame *into said calculating means.*

11. The combination of claim 10 including means to selectively enter player blind score *into said calculating means.*

12. The combination of claim 11 including means to selectively enter team handicap *into said calculating means.*

13. The combination of claim 12 including means to selectively enter team marks handicap *into said calculating means.*

14. An automatic bowling scorer for presenting a visual display of the history of a game of bowling comprising a cathode-ray tube having a display face, circuit means for controlling the cathode-ray tube so that the display face of the cathode-ray tube is divided into discrete areas representative of the various frames of a game of bowling, first signal-generating means coupled to generate signals representative of the number of pins felled by a ball on a first lane, second signal-generating means coupled to generate signals representative of the number of pins felled by a ball on a second lane, search means to select the lane on which a ball has been rolled, memory means coupled to the signal generating means of the lane selected by the search means to receive and store signals representative of pinfall for the ball rolled, calculating means to compute total score frame by frame to the last frame bowled coupled to feed said total score frame by frame to said memory means, and display logic means fed by said memory means to drive said cathode-ray tube to display the score history of the game frame by frame.

15. The combination of claim 14 including manually controlled signal-generating means coupled to feed selectively signals representative of pinfall to said memory means.

16. The combination of claim 15 wherein said calculating means includes means to inhibit the display of the score history of the game frame by frame during the occurrence of an unbroken string of strikes.

17. The combination of claim 16 wherein said memory means comprises a recirculating delay line.

18. An automatic bowling scorer for presenting a visual display of the history of a game of bowling comprising a first cathode-ray tube having a display face, circuit means for controlling the cathode-ray tube so that the display face of the cathode-ray tube is divided into discrete areas representative of the various frames of games of bowling, said first cathode-ray tube being associated with a first lane, a second cathode-ray tube having a display face, circuit means for controlling the cathode-ray tube so that the display face of the cathode-ray tube is divided into discrete areas representative of the various frames of other games of bowling, said second cathode-ray tube being associated with a second lane, first signal-generating means coupled to generate signals representative of the number of pins felled by a ball on the first lane, second signal-generating means coupled to generate signals representative of the number of pins felled by a ball on the second lane, memory means to receive and store signals representative of the history of the games, search means to selectively couple said first signal-generating means and said second signal-generating means to said memory means, calculating means to compute total score frame by frame as a game progresses for each player and to feed said total score frame by frame to said memory means, and display logic means fed by said memory means to drive said first cathode-ray tube to display the score history of the games of a first group of players frame by frame and to drive said second cathode-ray tube to display the score history of the games of a second group of players frame by frame, and means coupled to said display logic means to generate for selective display spare and strike occurrences.

19. The combination of claim 18 including controllable signal-generating means selectively coupled by said search means to said memory means to modify the number of pins felled by a rolled ball.

20. The combination of claim 19 wherein said controllable signal generating means comprises means to generate a team handicap entry.

21. The combination of claim 20 wherein said controllable signal-generating means comprises means to generate a team marks handicap entry.

22. The combination of claim 21 wherein said controllable signal-generating means comprises means to generate a player blind score entry.

23. The combination of claim 22 including means fed by said memory means to record permanently the history of a game of bowling.

24. The combination of claim 23 wherein said means comprises a magnetic tape.

25. The combination of claim 23 wherein said means comprises a printed tape.

26. The combination of claim 23 wherein said means comprises a punched tape.

*27. The combination defined in claim 1 including display logic means coupled to said cathode-ray tube to constrain the latter to indicate pinfall and totals for each frame of a said game of bowling.*

*28. The Combination of claim 6 including means fed by said calculating means to record permanently the history of the game bowled.*

*29. The combination of claim 28 wherein said means comprises a magnetic tape.*

*30. The combination of claim 28 wherein said means comprises a printed record.*

*31. The combination of claim 28 wherein said means comprises a punched tape.*

*32. The combination of claim 6 including means to selectively enter pinfall for a ball of a desired frame into said calculating means.*

*33. The combination of claim 6 including means to selectively enter team handicap into said calculating means.*

*34. The combination of claim 6 wherein said calculating means includes means to inhibit the display of the score history of the game of a player frame by frame during the occurrence of an unbroken string of strikes by that player.*

*35. The combination of claim 6 including means to selectively enter pinfall for a ball of any given frame; and*

*wherein said calculating means includes means updating the displayed totals of frames subsequent to said given frame and previously scored in said bowling game.*

*36. The combination of claim 7 including means to selectively enter pinfall for a ball of any given frame; and*

*wherein said calculating means includes means updating said pinfall stored in said memory means and the displayed totals of frames subsequent to said given frame and previously scored in said bowling game.*

*37. The combination of claim 7 wherein said calculating means includes means to inhibit the display of the score history of the game of a given player frame by frame during the occurrence of an unbroken string of strikes.*

*38. An automatic bowling scorer for presenting a visual display of the history of a game of bowling for two teams of bowlers comprising:*

*cathode-ray tube means for displaying said history having display face means on which said history is displayed for each of said teams;*

*circuit means for controlling the display face means of said cathode-ray tube means so that portions of said display face means are divided into discrete areas representative of the various bowling frames to be bowled by each team and each player thereon;*

*signal generating means coupled to generate signals representative of the number of pins felled by a given ball during the course of said game and the player and team identity for that ball;*

*calculating means fed by said signal generating means to compute the total score of an identified player representative of the number of pins felled according to the rules of the game as the game progresses frame by frame; and*

*display logic means fed by said calculating means to drive said cathode-ray tube means to display the score history of the game frame by frame for said players and said teams on said display face means.*

*39. The combination of claim 38 including means fed by said calculating means to record permanently the history of the game bowled.*

*40. The combination of claim 38, wherein said signal generating means includes means to identify a given frame to which said given ball is related; and*

*said calculating means includes means updating the displayed totals of frames subsequent to said given frame and previously scored in said bowling game.*

* * * * *